(12) United States Patent
Jacob et al.

(10) Patent No.: US 11,732,516 B2
(45) Date of Patent: Aug. 22, 2023

(54) DOOR CLOSER ADJUSTMENT WITH BACKOUT DISCOURAGEMENT

(71) Applicant: Schlage Lock Company LLC, Carmel, IN (US)

(72) Inventors: Colins V. Jacob, Bangalore (IN); Christopher A. Salisbury, Ohio, IL (US); Kanagaraj Shanmugam, Virudhunagar District (IN); Zachary P. Boomer, Indianapolis, IN (US); Daniel Cannon, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 163 days.

(21) Appl. No.: 17/373,029

(22) Filed: Jul. 12, 2021

(65) Prior Publication Data

US 2023/0007921 A1 Jan. 12, 2023

(51) Int. Cl.
*E05F 3/10* (2006.01)
*E05F 3/12* (2006.01)
*F16B 35/04* (2006.01)

(52) U.S. Cl.
CPC .............. *E05F 3/12* (2013.01); *F16B 35/041* (2013.01); *E05Y 2201/716* (2013.01); *E05Y 2201/722* (2013.01); *E05Y 2900/132* (2013.01)

(58) Field of Classification Search
CPC . Y10T 16/577; Y10T 16/2804; Y10T 16/285; Y10T 16/293; Y10T 16/585; Y10T 16/299; Y10T 16/286; Y10T 16/27; E05F 3/10; E05F 3/12; E05F 3/104; E05F 3/102; E05F 3/22; E05F 3/221; E05F 3/223; E05F 3/227; E05Y 2900/132; E05Y 2201/716; E05Y 2201/722; F16B 35/041
See application file for complete search history.

(56) References Cited

U.S. PATENT DOCUMENTS

| | | | |
|---|---|---|---|
| 2,881,646 | A | 4/1959 | Farr et al. |
| 3,337,902 | A | 8/1967 | Webb et al. |

(Continued)

FOREIGN PATENT DOCUMENTS

| | | |
|---|---|---|
| CA | 2840214 C | 3/2018 |
| CN | 2736499 Y * | 1/2021 |

(Continued)

OTHER PUBLICATIONS

Allegion; LCN 4000 Series Surface Mounted Closers; Rev. Apr. 2020; 76 pages; Copyright 2020 Allegion.

(Continued)

*Primary Examiner* — Chuck Y Mah
(74) *Attorney, Agent, or Firm* — Taft Stettinius & Hollister LLP (57) ABSTRACT

An exemplary door closer includes a body, a regulation screw, and an indicator. The body includes a surface and a cavity extending from the surface into the body, and the cavity includes an internal threading. The regulation screw is mounted in the cavity and includes an external threading engaged with the internal threading. The indicator is engaged with the regulation screw and positioned at least partially within the cavity. The indicator is positioned to project beyond the surface when the regulation screw is withdrawn to a reference position relative to the body.

30 Claims, 6 Drawing Sheets

(56) References Cited

U.S. PATENT DOCUMENTS

| | | | |
|---|---|---|---|
| 4,148,111 A * | 4/1979 | Lieberman | E05F 3/102 16/84 |
| 4,665,583 A | 5/1987 | Frolov et al. | |
| 6,112,368 A | 9/2000 | Luckett | |
| 6,205,615 B1 | 3/2001 | Jensen et al. | |
| 6,493,904 B1 * | 12/2002 | Chiang | E05F 3/104 16/56 |
| 9,714,534 B1 * | 7/2017 | DeGott | E05F 3/108 |
| 10,815,712 B2 | 10/2020 | Toloday et al. | |
| 10,858,872 B2 | 12/2020 | Barbon et al. | |
| 10,961,760 B2 | 3/2021 | Shetty et al. | |
| 2010/0192325 A1 | 8/2010 | Hufen | |
| 2011/0030167 A1 * | 2/2011 | Chiang | E05F 3/104 16/78 |
| 2019/0264486 A1 | 8/2019 | Toloday et al. | |
| 2020/0347657 A1 | 11/2020 | Eickhoff et al. | |

FOREIGN PATENT DOCUMENTS

| | | | |
|---|---|---|---|
| CN | 212359449 U * | 1/2021 | |
| EP | 2905407 B1 * | 11/2016 | E05F 3/12 |
| JP | H0860936 A * | 3/1996 | |
| WO | 2020163858 A2 | 8/2020 | |

OTHER PUBLICATIONS

International Search Report; International Searching Authority; International Application No. PCT/US2022/036801; dated Feb. 16, 2023; 2 pages.

Written Opinion of the International Searching Authority; International Searching Authority; International Application No. PCT/US2022/036801; dated Feb. 16, 2023; 4 pages.

\* cited by examiner

DOOR CLOSER ADJUSTMENT WITH BACKOUT DISCOURAGEMENT

TECHNICAL FIELD

The present disclosure generally relates to door closers, and more particularly but not exclusively relates to hydraulic door closers.

BACKGROUND

Door closers are commonly installed to swinging doors to bias the door towards a closed position. Many such door closers include a piston that reciprocates within a body, which is filled with a hydraulic fluid that resists the movement of the piston. The body defines a flow passage through which the hydraulic fluid flows as the piston reciprocates, and an adjustable regulation screw valve controls the rate of fluid flow through the passage to modulate the speed of the piston. The screw valve is typically screwed into a threaded cavity formed in the body, and can be rotated in opposite directions to advance further into the cavity and withdraw from the cavity. However, it has been found that certain closers of this type suffer from drawbacks and limitations, such as those related to ease of adjustment. For example, if the screw valve is backed out too far, the hydraulic fluid will begin to leak from the passage, thereby causing the closer to fail. For these reasons among others, there remains a need for further improvements in this technological field.

SUMMARY

An exemplary door closer includes a body, a regulation screw, and an indicator. The body includes a surface and a cavity extending from the surface into the body, and the cavity includes an internal threading. The regulation screw is mounted in the cavity and includes an external threading engaged with the internal threading. The indicator is engaged with the regulation screw and positioned at least partially within the cavity. The indicator is positioned to project beyond the surface when the regulation screw is withdrawn to a reference position relative to the body. Further forms, features, and embodiments shall become apparent upon review of the description and drawings provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
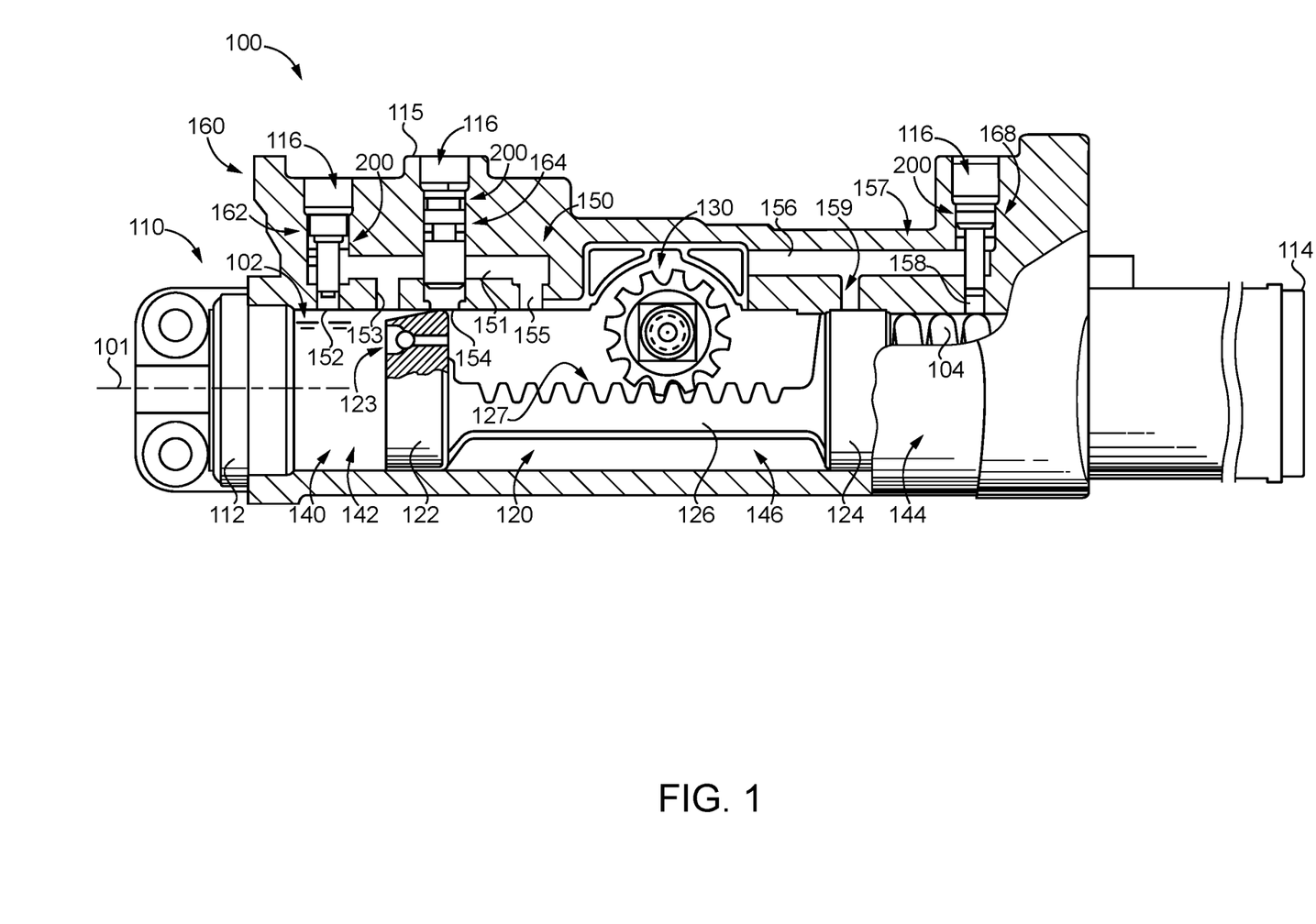
FIG. 1 is a partial cutaway illustration of a door closer according to certain embodiments.

With reference to FIG. 1, illustrated therein is a door closer 100 according to certain embodiments. The closer 100 extends along a longitudinal axis 101 defining a proximal direction (to the left in FIG. 1) and an opposite distal direction (to the right in FIG. 1). The closer 100 generally includes a body 110, a piston 120 mounted for reciprocal movement within the body 110, and a pinion 130 rotatably mounted to the body 110 and engaged with the piston 120. The body 110 defines a hydraulic chamber 140 including a plurality of sub-chambers and a plurality of passages 150 defining paths of fluid communication between the sub-chambers. The hydraulic chamber 140 is filled with a hydraulic fluid 102. The door closer 100 further includes a valve assembly 160 including a plurality of regulation screws 200 that regulate the flow of the hydraulic fluid 102 through the passages 150. While one form of hydraulic door closer 100 is provided herein for purposes of illustration, it is to be appreciated that the embodiments described herein may be utilized in door closers of other forms and formats.

Figure 3:
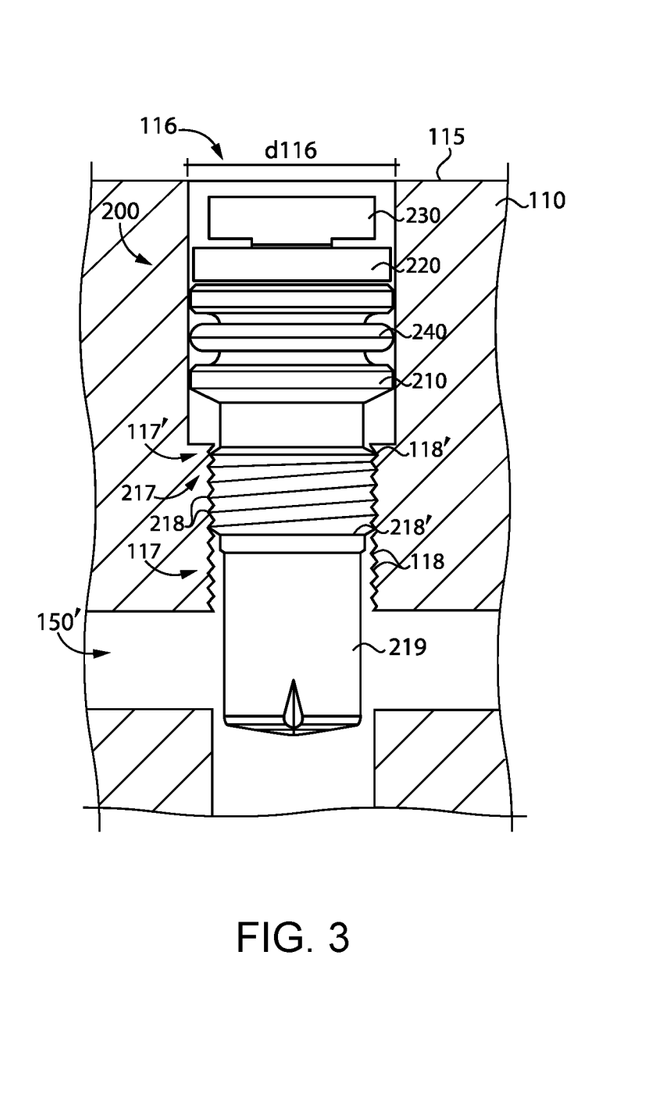
FIG. 3 illustrates a regulation screw of the door closer in an advanced position.
Figure 4:
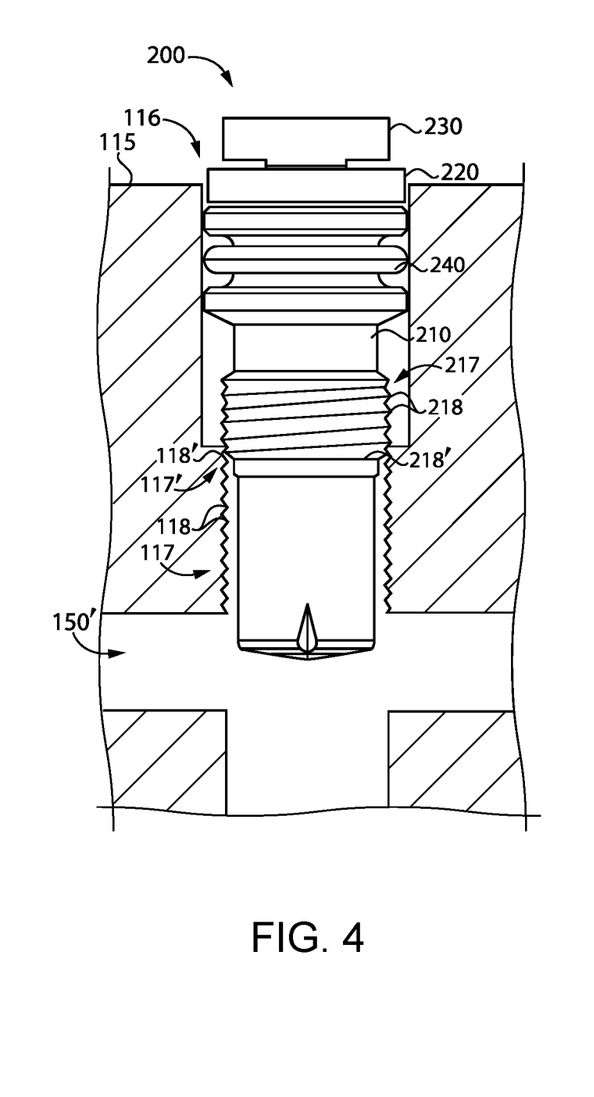
FIG. 4 illustrates the regulation screw in a partially withdrawn position.

The body 110 defines the hydraulic chamber 140, and is filled with the hydraulic fluid 102. The body 110 includes a proximal end cap 112 enclosing a proximal end of the hydraulic chamber 140 and a distal end cap 114 enclosing a distal end of the hydraulic chamber 140. Also disposed in the body 110 is a spring 104, which is engaged with the piston 120 and biases the piston 120 in the proximal direction. The body 110 further defines a plurality of cavities 116, each of which extends through an outer surface 115 of the body 110. Each cavity 116 is in fluid communication with a corresponding one of the passages 150 and houses a corresponding and respective one of the regulation screws 200. As described herein, each of the cavities 116 includes an internally threaded section or internal threading 117 that includes a plurality of threads 118, the outermost of which is a terminal thread 118' (FIGS. 3 and 4).

The piston 120 is mounted for reciprocal movement within the hydraulic chamber 140, and generally includes a proximal wall 122, a distal wall 124, and a body portion 126 extending between and connecting the proximal wall 122 and the distal wall 124. As described herein, the proximal wall 122 and the distal wall 124 are closely engaged with the inner wall of the body 110 and separate the hydraulic chamber 140 into three sub-chambers. The proximal wall 122 includes a check valve 123, and the body portion 126 defines a rack gear 127 that is engaged with the pinion 130.

The pinion 130 is rotatably mounted to the body 110 and is engaged with the rack gear 127 such that rotation of the pinion 130 in opposite directions is correlated with the reciprocal movement of the piston 120. A door control arm is mounted to the pinion 130 and is engaged with either the door or the doorframe such that swinging movement of the door is correlated with rotation of the pinion 130, linear movement of the piston 120, and compression/extension of the spring 104. For example, opening movement of the door is correlated with rotation of the pinion 130 in a door-opening direction (counter-clockwise in FIG. 1), distal movement of the piston 120, and compression of the spring 104. Conversely, closing movement of the door is correlated with rotation of the pinion 130 in a door-closing direction (clockwise in FIG. 1), proximal movement of the piston 120, and expansion of the spring 104.

The hydraulic chamber 140 is divided into three portions or sub-chambers by the piston 120. More particularly, a proximal chamber 142 is defined between the proximal wall 122 and the proximal end cap 112, a distal chamber 144 is defined between the distal wall 124 and the distal end cap 114, and an intermediate chamber 146 is defined between the proximal wall 122 and the distal wall 124. As will be appreciated, the reciprocal movement of the piston 120 causes expansion and contraction of the proximal and distal chambers 142, 144, while the intermediate chamber 146 remains of a substantially constant volume. In certain forms, the hydraulic chamber 140 may be considered to include the passages 150.

The passages 150 and 157 include a proximal passage 151 including branches 152-155, and a distal passage 156 including branches 158, 159. The proximal passage 151 forms a fluid connection between the proximal chamber 142 and the intermediate chamber 146, and the distal passage 156 forms a fluid connection between the intermediate chamber 146 and the distal chamber 144. The branches 152-155, 158, 159 form selective paths of fluid communication between the various portions of the hydraulic chamber 140 based upon the position of the piston 120, and the valve assembly 160 regulates the flow of hydraulic fluid 102 through the passages 150. As described herein, the effective cross-sectional area of the passages 150 depends upon a number of factors, including the state of the valve assembly 160 and which of the branches are connected to which of the chambers.

The valve assembly 160 includes a plurality of regulation screws 200, including a latch speed regulating valve 162, a main speed regulating valve 164, and a backcheck speed regulating valve 168, each of which is mounted in a corresponding and respective cavity 116 and extends into a corresponding and respective one of the branches 152, 154, 158.

Figure 2:
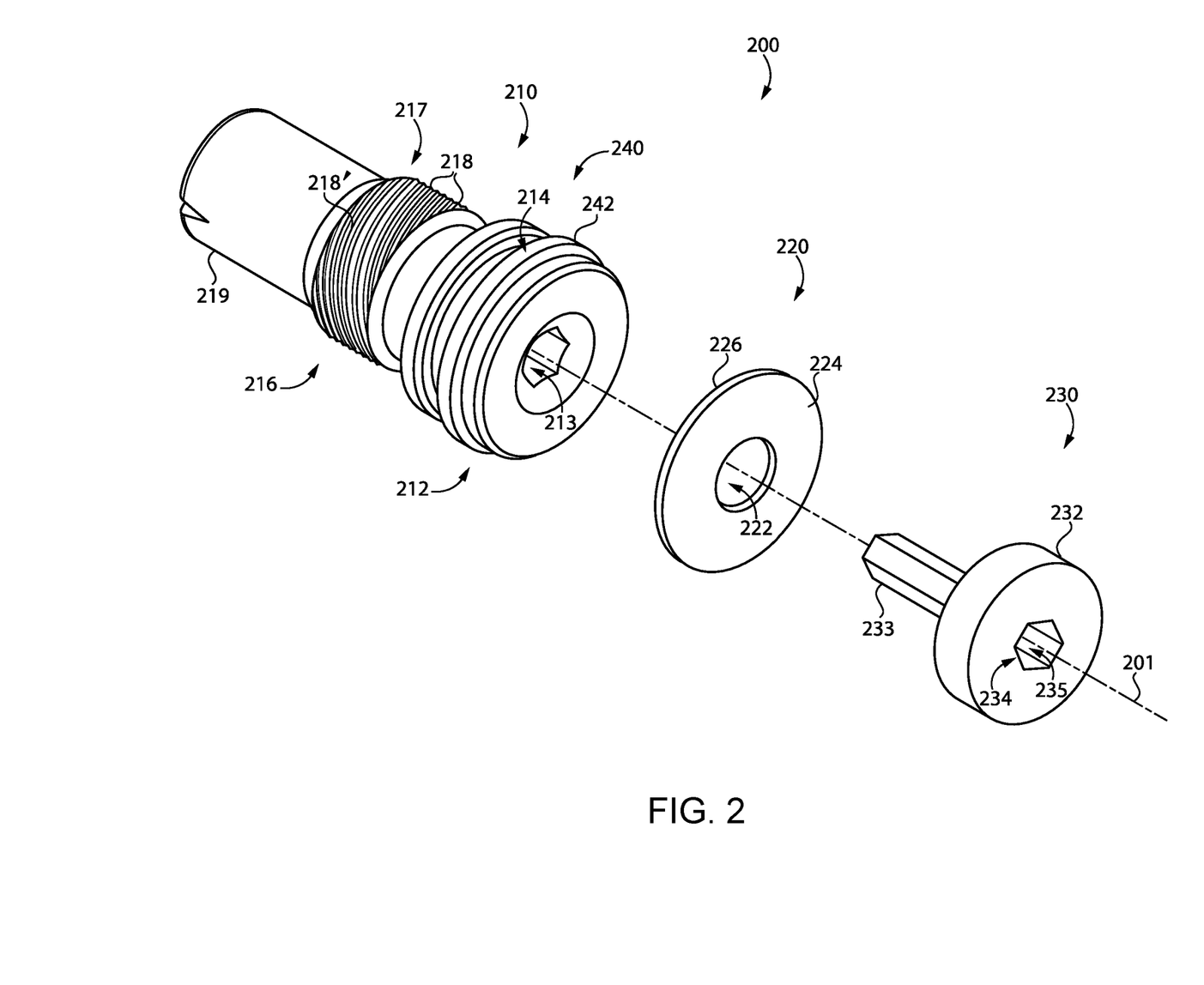
FIG. 2 is an exploded assembly view of a regulation screw according to certain embodiments.

With additional reference to FIG. 2, a regulation screw 200 according to certain embodiments extends along a rotational axis 201 and generally includes a valve portion 210 and an indicator 220 engaged with the valve portion 210. The illustrated regulation screw 200 further includes a plug portion 230 coupled with the valve portion 210, and a seal 240 such as an O-ring mounted to the valve portion 210. In certain embodiments, the regulation screw 200 may be considered to include the indicator 220, while in other embodiments the regulation screw 200 and the indicator 220 may be considered to be separate components.

The valve portion 210 generally includes a head 212 and a valve body 216 extending from the head 212. The head 212 includes an opening 213 configured to receive a tip of a tool and/or a post 233 of the plug portion 230 such that the valve portion 210 can be rotated by the tool and/or the plug portion 230. In the illustrated form, the opening 213 has a generally hexagonal cross-section, and is configured to receive the tip of a hex key. It is also contemplated that the opening 213 may have another geometry, such as square or cross-shaped. The illustrated head 212 also includes an annular channel 214 in which the seal 240 is seated. The valve body 216 includes an externally-threaded section or external threading 217 including a plurality of screw threads 218, one of which is a terminal thread 218'. More particularly, when the valve portion 210 is inserted in the cavity 116, the terminal thread 218' is the innermost thread. As a result, the terminal thread 218' is the first to engage the internal threading 117 during insertion of the screw 200, and is the last to disengage from the internal threading 117 during withdrawal or removal of the screw 200. The valve body 216 also includes a stem 219 operable to project into a corresponding passage to modulate the flow of hydraulic fluid 102 through the passage.

The indicator 220 is engaged with the head 212 of the valve portion 210, and in the illustrated form is mounted to the head 212. The indicator 220 includes an opening 222 through which the post 233 extends such that the indicator 220 is captured between the head 212 of the valve portion 210 and a body 232 of the plug portion 230. The indicator 220 may, for example, be formed of a resilient material such as rubber or a dense foam. The indicator 220 may be provided in a different color than the valve portion 210 and/or the plug portion 230. In certain embodiments, the indicator 220 may be provided as a relatively bright color. In certain embodiments, the indicator 220 may be red, orange, yellow, blue, or purple. In certain embodiments, the indicator 220 may be provided in multiple colors. For example, a forward face 224 of the indicator 220 may be a first color, and the radially outer side 226 of the indicator 220 may be a second color different from the first color.

In the illustrated form, the indicator 220 is captured between the head 212 of the valve portion 210 and the body 232 of the plug portion 230. It is also contemplated that the indicator 220 may be mounted to the valve portion 210 in another manner, such as via adhesives. In such forms, the plug portion 230 may be omitted. It is further contemplated that an indicator may be engaged with the head 212 in another manner, such as that described below with reference to FIGS. 8 and 9.

The plug portion 230 generally includes a body 232 and a post 233 extending from the body 232. The post 233 extends through the indicator opening 222 and into the valve opening 213 to couple the plug portion 230 with the valve portion 210. The post 233 may have a cross-sectional geometry corresponding to that of the opening 213 to facilitate such coupling. For example, the illustrated post 233 has a generally hexagonal geometry that matches the generally hexagonal geometry of the opening 213. Formed in a front face of the body 232 is an engagement feature 234 that facilitates rotation of the plug portion 230. In the illustrated form, the engagement feature 234 is provided in the form of an opening 235 configured to receive the tip of a tool. More particularly, the illustrated opening 235 has a generally hexagonal geometry configured to receive the tip of a hex key. It is also contemplated that the opening 235 may have a different geometry, or may be replaced by a protrusion. Such a protrusion may be configured for engagement with a tool, or may be configured to facilitate manual manipulation of the regulation screw 200.

The illustrated seal 240 is provided in the form of an O-ring 242 that is positioned in the annular channel 214 of the valve portion 210. The seal 240 aids in discouraging hydraulic fluid 102 from exiting the closer body 110 when the regulation screw 200 is installed in a corresponding cavity 116. More particularly, the O-ring engages the wall of the cavity 116 to thereby form the seal 240.

FIG. 1 illustrates the closer with the piston 120 in a position corresponding to the main swing zone of the door. In this state, the proximal chamber 142 is in fluid communication with the intermediate chamber 146 via the first passage 151. More particularly, the branches 152, 153 are open to the proximal chamber 142, and the branches 154, 155 are open to the intermediate chamber 146. During opening movement of the door, the piston 120 moves in the distal direction, thereby expanding the proximal chamber 142 and contracting the distal chamber 144. As a result, fluid 102 flows from the distal chamber 144 into the intermediate chamber 146 via the distal passage 156. Fluid 102 also flows from the intermediate chamber 146 to the proximal chamber 142 via the check valve 123 and the proximal passage 151. During closing movement of the door, the piston 120 moves in the proximal direction, thereby contracting the proximal chamber 142 and expanding the distal chamber 144. As a result, fluid 102 flows from the proximal chamber 142 into the intermediate chamber 146 via the proximal passage 151, and flows from the intermediate chamber 146 into the distal chamber 144 via the distal passage 156.

As will be appreciated, the rate of fluid flow through the passages 150 is correlated with the movement speed of the piston 120, and thus with the movement speed of the door. The rate of fluid flow through the passages 150 depends upon a number of factors, including the effective cross-sectional area of the passage. Additionally, the effective cross-sectional area of each passage can be altered by adjustment of the valve assembly 160. For example, advancing the regulation screw 200 of the main speed adjustment valve 164 reduces the effective cross-sectional area of the proximal passage 151 at the branch 154, thereby reducing the closing speed of the door in the main swing zone. As another example, withdrawing the screw 200 of the latch speed adjustment valve 162 increases the effective cross-sectional area of the proximal passage 151 at the branch 152, thereby increasing the closing speed of the door in the latching zone.

Because the cavities 116 are connected with the passageways 150, the hydraulic fluid 102 left unchecked would be able to leak from the hydraulic chamber 140 via the cavities 116. When the screw 200 is threaded into the cavity 116, such leakage is prevented by the engagement of the threads 117, 217 and the seal provided by the O-ring 240. If the screw 200 were to be withdrawn beyond the withdrawn position and/or removed from the cavity 116, leakage may occur. However, such an event is discouraged by the indicator 230, which provides a visual indication when the screw 200 has reached a reference position.

With additional reference to FIGS. 3 and 4, illustrated therein is the regulation screw 200 installed to a cavity 116 that is connected with a passage 150', which may be any of the passages 150, or another form of passage not specifically illustrated herein. FIG. 3 illustrates the screw 200 in an advanced position in which the stem 219 projects into the passage 150' to restrict flow through the passage 150', and FIG. 4 illustrates the screw 200 in a partially-withdrawn position in which the innermost or terminal thread 218' of the regulation screw 200 is engaged with an outermost region 117' of the internal threading 117.

In the advanced position illustrated in FIG. 3, the terminal thread 218' of the regulation screw 200 is not engaged with the threads 118 of the outermost region 117', and is instead engaged with a more-inward thread of the internal threads 118. As such, the engaged threadings 117, 217 resist the internal pressures within the passage 150' and maintain the regulation screw 200 within the cavity 116.

In the partially-withdrawn position illustrated in FIG. 4, the innermost or terminal thread 218' of the regulation screw 200 is engaged with the outermost region 117' of the internal threading 117. The outermost region 117' includes the outermost or terminal thread 118' of the internal threading 117, and further includes at least one additional thread 118. In certain forms, the outermost region 117' may be considered to include the terminal thread 118' and exactly one additional thread 118. In certain forms, the outermost region 117' may be considered to include the terminal thread 118' and exactly two additional threads 118.

When the regulation screw 200 is installed to the cavity 116, the indicator 220 is positioned to project beyond the outer surface 115 of the body 110 when the regulation screw 200 is withdrawn to a reference position relative to the body 110. This projection of the indicator 220 beyond the surface 115 indicates to the user that the regulation screw 200 has reached the reference position.

In certain forms, the reference position may be the partially-withdrawn position illustrated in FIG. 4, in which the innermost or terminal thread 218' of the screw 200 is engaged with outermost region 117' (e.g., the outermost thread 118') of the internal threading 117. In such forms, projection of the indicator 220 beyond the surface 115 may indicate to the user that withdrawing the screw 200 further will cause disengagement of the threadings 117, 217, and is thus inadvisable.

In certain forms, the reference position may be a fully withdrawn position in which the innermost or terminal thread 218' of the screw 200 is disengaged from the outermost thread 118' of the internal threading 117, or one in which the terminal thread 218' is disengaged from the outermost thread 118' but remains adjacent the outermost thread 118'. In such forms, projection of the indicator 220 beyond the surface 115 may indicate to the user that the screw 200 has been withdrawn too far, and should be advanced once again to discourage leakage of hydraulic fluid 102 via the cavity 116.

As noted above, the indicator 220 may be of a different color than the plug 230 and/or the surface 115. Such differing colors may aid a user in determining when the indicator 220 has breached the surface 115. In embodiments in which the front face 224 is provided in a first color and the outer surface 226 is provided in a second color, visibility of the second color may indicate to the user that the regulation screw 200 has reached its reference position.

Figure 5:
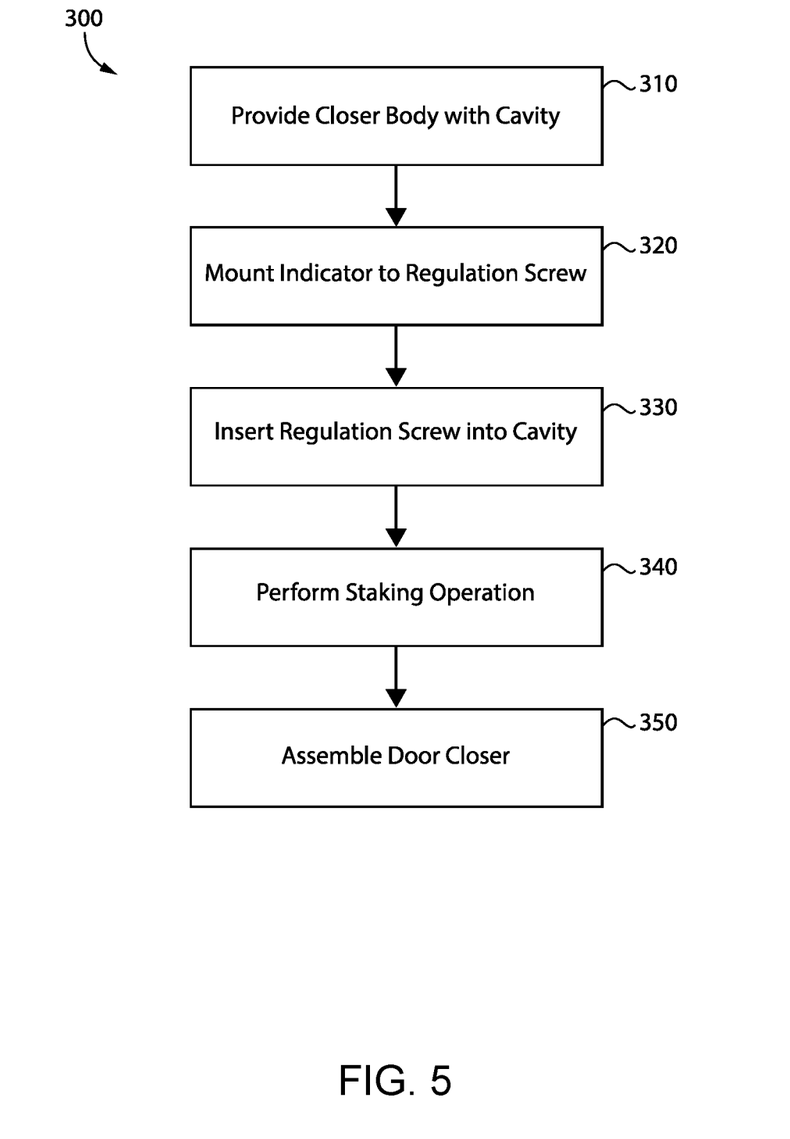
FIG. 5 is a schematic flow diagram of a process according to certain embodiments.

With additional reference to FIG. 5, an exemplary process 300 that may be performed to manufacture a door closer such as the door closer 100 is illustrated. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Moreover, while the process 300 is described herein with specific reference to the closer 100 illustrated in FIG. 1, it is to be appreciated that the process 300 may be performed to manufacture a door closer having additional or alternative features.

The process 300 may include block 310, which generally involves providing a closer body including a cavity. For example, block 310 may involve providing the closer body 110, which includes plural cavities 116, each of which is connected with at least one corresponding passage 150. In certain embodiments, the closer body 110 may be cast. Each cavity 116 has a diameter d116 corresponding to the diameter of the head 212 of the valve portion 210 such that the head 212 is operable to be received in the cavity 116.

The process 300 may include block 320, which generally involves mounting an indicator to a regulation screw. For example, block 320 may involve mounting the indicator 220 to the valve portion 210. In certain embodiments, block 320 may involve adhering the indicator 220 to the valve portion 210. Additionally or alternatively, block 320 may involve coupling the indicator 220 to the valve portion 210 using the plug portion 230 as described above. Block 320 may further include mounting the O-ring 240 to the valve portion 210.

The illustrated process 300 includes block 330, which generally involves inserting the regulation screw into the cavity. For example, block 330 may involve inserting the valve portion 210, optionally including the indicator 220 and/or the plug portion 230, into the cavity 116. It should be appreciated that block 330 may be repeated as warranted to place plural regulation screws 200 into corresponding cavities 116.

Figure 6:
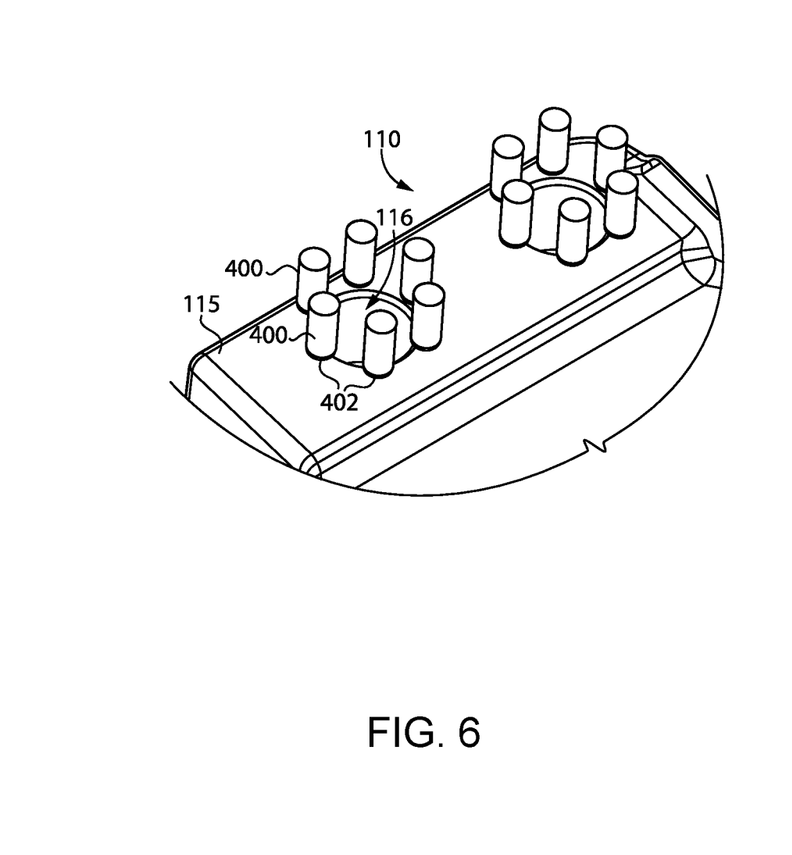
FIG. 6 is a schematic perspective illustration of a staking operation according to certain embodiments.
Figure 7:
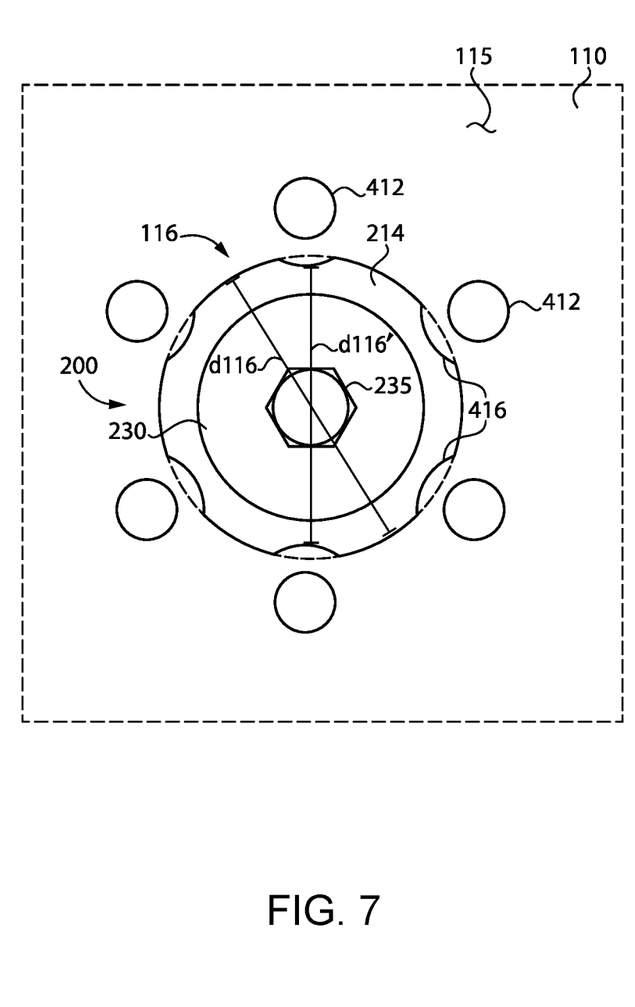
FIG. 7 is a plan view of a portion of a door closer according to certain embodiments.

With additional reference to FIGS. 6 and 7, the illustrated process 300 further includes block 340, which generally involves performing a staking operation to deform the door closer body 110 in a manner that discourages removal of the regulation screw from the cavity. More particularly, the illustrated form of block 340 involves staking the closer body 110 with one or more rounded staking tools 400. Each staking tool 400 generally includes a rounded tip 402, which is placed into contact with the surface 115 just outside the cavity 116. A force is then applied to each staking tool 400 to deform the body 110. The deformation of the body 110 creates a rounded indentation 412 corresponding to the rounded tip 402, and forces the material of the body 110 away from the tip 402. Some of the material is forced into the cavity 116, thereby creating projections 416 that project into the otherwise circular entryway of the cavity 116. The entryway to the cavity 116 is thereby provided with a reduced diameter d116', which is less than the diameter of the head 212. As a result, removal of the valve portion 210 from the cavity 116 is discouraged or prevented.

In the illustrated form, the staking operation of block 340 involves staking the body 110 with six staking tools 400, which are equally spaced about the periphery of the cavity 116. It is also contemplated that more or fewer staking tools 400 may be utilized. In embodiments in which plural staking tools 400 are utilized, they may be evenly spaced about the periphery of the cavity 116, or they may be unevenly spaced about the periphery of the cavity 116. Certain embodiments involve forming three indentations 412 in a generally triangular pattern. Certain embodiments involve forming four indentations 412 in a generally square pattern. Certain embodiments involve forming four indentations 412 in an oblong rectangular pattern. Certain embodiments involve forming five indentations 412 in a generally pentagonal pattern. Certain embodiments involve forming six indentations 412 in a generally hexagonal pattern. Certain embodiments involve forming eight indentations 412 in a generally octagonal pattern.

In certain embodiments, the process 300 may further include block 350, which generally involves assembling the door closer. For example, block 350 may include movably mounting a rack 126 within the door closer body 110 and/or engaging a pinion 130 with the rack 126 such that rotation of the pinion 130 is correlated with movement of the rack 126. Block 350 may further include engaging a spring 104 with the rack 126 to thereby bias the rack 126 in a door-closing direction. Block 350 may further include filling a passage 150' of the door closer body 110 with a hydraulic fluid 102 such that the hydraulic fluid 102 flows through the passage 150' during movement of the rack 126, and such that the regulation screw 200 modulates the flow of hydraulic fluid 102 through the passage 150'.

Figure 8:
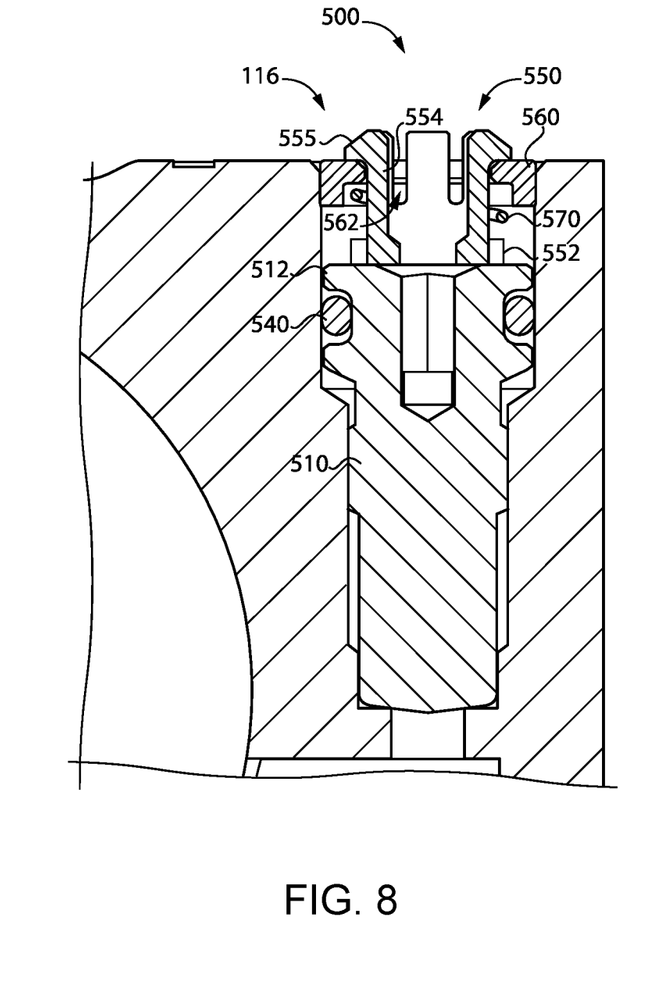
FIG. 8 is a cross-sectional view of a regulation screw assembly according to certain embodiments.

With additional reference to FIG. 8, illustrated therein is a regulation screw assembly 500 according to certain embodiments. The regulation screw assembly 500 is somewhat similar to the regulation screw 200, and similar reference characters are used to denote similar elements and features. For example, the regulation screw assembly 500 generally includes a valve portion 510 and an O-ring 540, which respectively correspond to the valve portion 210 and the O-ring 240. In the illustrated form, an indicator 550 is provided in a generally tubular configuration, and the regulation screw assembly 500 further includes a stop 560 and a spring 570. In the interest of conciseness, the following description of the regulation screw assembly 500 primarily focuses on elements and features not specifically described above with reference to the regulation screw 200.

The illustrated indicator 550 is generally annular, and includes a base 552 facing the head 512 of the valve portion 510. The indicator further includes a plurality of resilient arms 554 extending from the base 552 away from the valve portion 510 and through an opening 562 in the stop 560. Each arm 554 includes a corresponding finger 555 operable to abut an outer surface of the stop 560 to prevent the indicator 550 from fully entering the cavity 116. The spring 570 is engaged with the base 552 and urges the indicator 550 into the cavity 116. As the valve portion 510 is withdrawn, the arms 554 begin to project from the stop 560, thereby indicating to the user that the valve portion 510 is approaching a reference position or has reached the reference position. In certain embodiments, the stop 560 may provide a positive stop that prevents further withdrawing motion of the valve portion 510. In other embodiments, the stop 560 may simply aid in positioning the indicator 550 without providing significant resistance to withdrawal of the valve portion 510.

Figure 9:
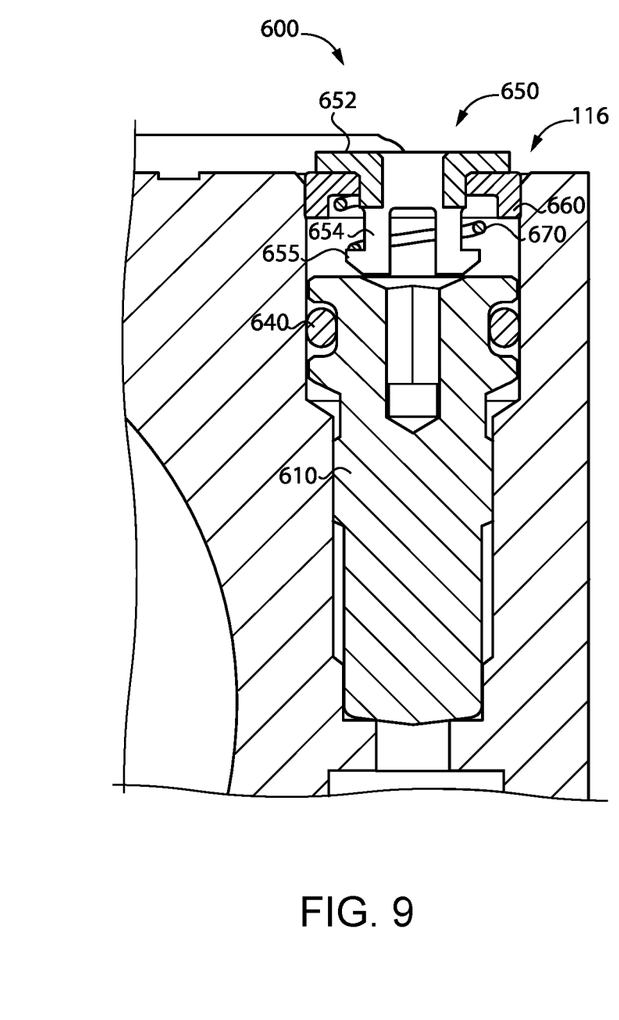
FIG. 9 is a cross-sectional view of a regulation screw assembly according to certain embodiments.

With additional reference to FIG. 9, illustrated therein is a regulation screw assembly 600 according to certain embodiments. The regulation screw assembly 600 is substantially similar to the regulation screw assembly 500, and similar reference characters are used to denote similar elements and features. For example, the regulation screw assembly 600 generally includes a valve portion 610, an O-ring 640, an indicator 650, a stop 660, and a spring 670, which respectively correspond to the valve portion 510, the O-ring 540, the indicator 550, the stop 560, and the spring 570. In the interest of conciseness, the following description of the regulation screw assembly 600 primarily focuses on elements and features not specifically described above with reference to the regulation screw assembly 500.

In the illustrated form, the indicator 650 is positioned in an opposite orientation as that illustrated in FIG. 8. As a result, the base 652 of the indicator 650 is positioned outside the cavity 116, and the plurality of resilient arms 654 extend through the stop 660 toward the head 612 of the valve portion 610. Additionally, the fingers 655 inhibit removal of the indicator 650 from the cavity 116, and provide an anchor point at which the spring 670 contacts the indicator 650. As the valve portion 610 is withdrawn, the arms 654 engage the head 612 and the base 652 moves away from the stop 660, thereby indicating to the user that the valve portion 610 is approaching a reference position or has reached the reference position.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A door closer, comprising:
    a body including a surface and a cavity extending from the surface into the body, wherein the cavity comprises an internal threading;
    a regulation screw mounted in the cavity and including an external threading engaged with the internal threading, wherein rotation of the regulation screw in a first direction advances the regulation screw, and wherein rotation of the regulation screw in an opposite second direction withdraws the regulation screw; and
    an indicator engaged with the regulation screw and positioned at least partially within the cavity, wherein the indicator is positioned to project beyond the surface when the regulation screw is withdrawn to a reference position relative to the body.

2. The door closer of claim 1, wherein the internal threading comprises a first reference thread that is offset from the surface;
    wherein the external threading comprises a second reference thread; and
    wherein the reference position is a partially-withdrawn position in which the first reference thread is engaged with the second reference thread.

3. The door closer of claim 2, wherein the first reference thread is a terminal internal thread of the internal threading; and
    wherein the second reference thread is a terminal external thread of the external threading.

4. The door closer of claim 1, wherein the internal threading includes an outermost region comprising a plurality of internal threads, the plurality of internal threads comprising an outermost terminal thread and at least one additional thread;
    wherein the external threading includes an innermost terminal thread; and
    wherein the reference position is a partially-withdrawn position in which the innermost terminal thread is engaged with the outermost region of the internal threading.

5. The door closer of claim 1, wherein the reference position is a disengaged position in which the external threading is disengaged from the internal threading.

6. The door closer of claim 1, wherein a visible portion of the regulation screw is a first color; and
    wherein the indicator is a second color different from the first color.

7. The door closer of claim 1, wherein the regulation screw comprises a valve portion comprising the external threading, and a plug portion coupled with the valve portion; and
    wherein the indicator is captured between the plug portion and the valve portion.

8. The door closer of claim 1, wherein the body further comprises at least one projection formed by staking the body with a rounded staking tool; and
    wherein the at least one projection prevents removal of at least a portion of the regulation screw from the cavity.

9. The door closer of claim 1, wherein rotation of the regulation screw in the first direction adjusts an operating characteristic of the door closer in a first manner; and
    wherein rotation of the regulation screw in the second direction adjusts the operating characteristic of the door closer in a second manner opposite the first manner.

10. The door closer of claim 1, further comprising:
    a stop coupled to the body; and
    a spring biasing the indicator toward a head of the regulation screw.

11. The door closer of claim 10, wherein the indicator comprises a base and a plurality of resilient arms extending through the stop.

12. The door closer of claim 1, wherein a top of the indicator is a first color;
    wherein a side of the indicator is a second color different from the first color; and wherein the side of the indicator is at least partially exposed when the regulation screw is withdrawn to the reference position relative to the body.

13. The door closer of claim 1, further comprising:
a pinion rotatably mounted to the body; and
a rack movably mounted in the body and engaged with the pinion such that rotation of the pinion is correlated with movement of the rack;
wherein the body further defines a passage through which a hydraulic fluid flows during at least a portion of a movement range of the rack; and
wherein the regulation screw is configured to modulate the flow of hydraulic fluid through the passage.

14. A door closer, comprising:
a body including a surface and a cavity extending from the surface into the body, wherein the cavity comprises an internal threading;
a regulation screw mounted in the cavity and including an external threading engaged with the internal threading; and
a projection extending into the cavity and preventing removal of the regulation screw from the cavity, wherein the projection is formed by staking the body with a staking tool having a rounded tip positioned in contact with the surface of the body and outwardly offset from an outer periphery of the cavity to form a rounded indentation in the body during the staking that is outwardly offset from the outer periphery to force material into the cavity.

15. The door closer of claim 14, further comprising an indicator mounted to the regulation screw within the cavity; and
wherein the indicator is positioned to project from the cavity beyond the surface when the regulation screw is withdrawn to a reference position relative to the body.

16. The door closer of claim 14, wherein formation of the rounded indentation in the body during the staking causes inward deformation of the outer periphery of the cavity.

17. The door closer of claim 14, wherein the staking tool comprises a plurality of rounded tips that form a corresponding plurality of rounded indentations in the body during the staking that are each outwardly offset from the outer periphery of the cavity.

18. The door closer of claim 17, wherein the staking tool comprises three or more of the plurality of rounded tips that form three or more of the plurality of rounded indentations in the body during the staking.

19. The door closer of claim 17, wherein the plurality of rounded indentations in the body are equally spaced about the outer periphery of the cavity.

20. A method, comprising:
inserting a regulation screw into a cavity formed in a door closer body; and
performing a staking operation to deform the door closer body in a manner that discourages removal of the regulation screw from the cavity; and
wherein the performing the staking operation comprises staking the door closer body with a staking tool having a rounded tip positioned in contact with a surface of the body and outwardly offset from an outer periphery of the cavity and forming a rounded indentation in the body that is outwardly offset from the outer periphery to force material into the cavity.

21. The method of claim 20, further comprising engaging an indicator with the regulation screw such that the indicator projects from the cavity when the regulation screw is in a reference position.

22. The method of claim 21, wherein mounting the indicator to the regulation screw comprises:
placing the indicator on a valve portion of the regulation screw; and
coupling a plug portion of the regulation screw to the valve portion such that the indicator is captured between the valve portion and the plug portion.

23. The method of claim 21, further comprising mounting a stop to the body; and
engaging a spring between the indicator and the stop such that the indicator is biased toward the regulation screw.

24. The method of claim 20, further comprising:
movably mounting a rack within the door closer body;
engaging a pinion with the rack such that rotation of the pinion is correlated with movement of the rack; and
filling a passage of the door closer body with a hydraulic fluid such that the hydraulic fluid flows through the passage during movement of the rack; and
wherein the regulation screw modulates the flow of hydraulic fluid through the passage.

25. The method of claim 20, wherein the staking tool comprises a plurality of rounded tips that form a corresponding plurality of rounded indentations in the body during the staking operation that are each outwardly offset from the outer periphery of the cavity.

26. The method of claim 25, wherein the staking tool comprises three or more of the plurality of rounded tips that form three or more of the plurality of rounded indentations in the body during the staking operation.

27. The method of claim 25, wherein the plurality of rounded indentations in the body are equally spaced about the outer periphery of the cavity.

28. A method, comprising:
inserting a regulation screw into a cavity formed in a door closer body; and
performing a staking operation to deform the door closer body in a manner that discourages removal of the regulation screw from the cavity; and
wherein the performing the staking operation comprises staking the door closer body with a staking tool having a plurality of rounded tips that form a corresponding plurality of rounded indentations in the body during the staking operation to force material into the cavity.

29. The method of claim 28, wherein the plurality of rounded indentations formed in the body are outwardly offset from an outer periphery of the cavity.

30. The method of claim 28, wherein the plurality of rounded indentations formed in the body are equally spaced about an outer periphery of the cavity.

* * * * *